UNITED STATES PATENT OFFICE.

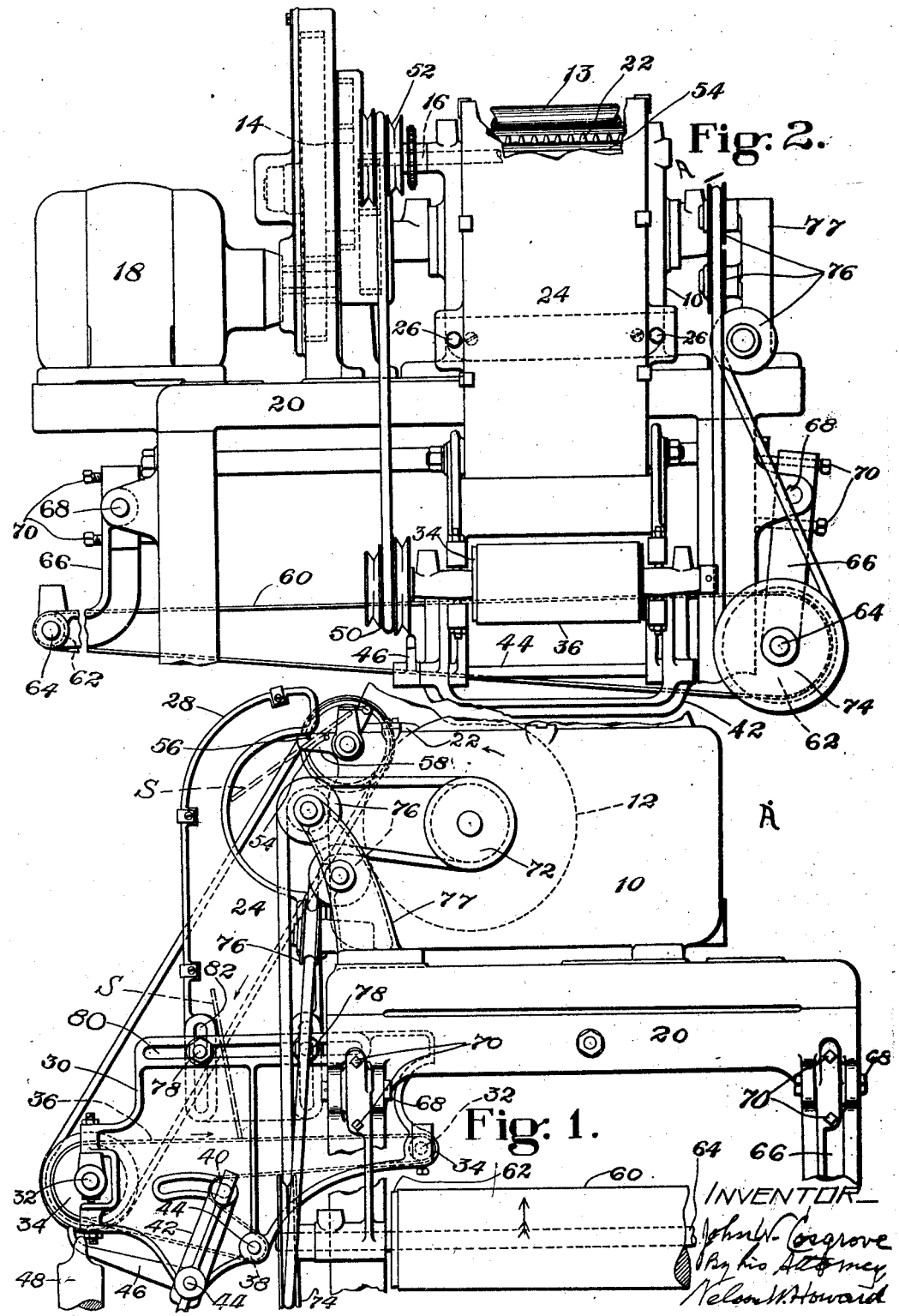

JOHN W. COSGROVE, OF MEDFORD, MASSACHUSETTS, ASSIGNOR TO UNITED SHOE MACHINE CORPORATION, OF PATERSON, NEW JERSEY, A CORPORATION OF NEW JERSEY.

COATING SYSTEM.

Application filed May 8, 1922. Serial No. 559,401.

The present invention relates to systems for coating objects, such, for example, as the soles of rubbers or shoes of the tennis type, to one side of which cement is applied before assembling. A popular machine for accomplishing this coating operation is that described in the patent in my name numbered 1,325,623 and dated December 23, 1919. In this, the cement is applied to the under sides of the work-pieces, advanced horizontally, and when the coated pieces are to be received by a conveyor which will carry them from the machine and permit them to dry before handling, the direct delivery to this conveyor results in the deposit of the still-fluid coating upon the supporting surface. This is objectionable, in that the conveyor takes the cement from the work-pieces, altering the thickness and uniformity of the coating and interfering with the removal of the pieces from the conveyor. It is an object of my invention to provide a system by which work will be coated and delivered, as to a conveyor, without subjecting the coated surface to any contact which will harmfully affect it.

In the attainment of this object, a feature of the invention consists in the combination with a coating machine, which may include a pair of rolls which coat and advance the work-pieces, of novel means for inverting said pieces. To this inverting means, which may consist of a movable member, as a conveyor, a coated object is delivered by a machine, it preferably falling by gravity through a substantial space, so that it turns in its descent from the coating-applying member, and an extremity only initially contacts with the member which, in its movement, effects the inversion. This inverting member preferably travels in the opposite direction to the applying surface at the coating machine, and may serve as a conveyor upon which the uncoated surfaces of the work-pieces rest, it being, for this purpose, in the form of a belt. It is herein shown as delivering to another conveyor, which is movable transversely of it and at a different rate of speed, preferably more slowly. This relation is because the rapidly moving conveyor most effectively causes the inversion of the objects by its engagement with their ends, and because, while the objects extend longitudinally of the inverting conveyor, they lie transversely of the receiving conveyor, and occupy less space in the direction of its length.

Some of the objects may be projected from the coating machine at a velocity too great, if left uncontrolled, to be properly presented to the inverting member. To obviate this difficulty, I interpose between the coating machine and the inverting means, novel means for modifying the movement of the object, as by changing its direction. One form which this modifying means may assume is that of a member having a wall situated in the path of advance of the coated objects, and being inclined downwardly and outwardly therefrom. This, if the object issuing from the coating machine is thrown far enough to strike it, will in itself tend to act as an inverting means, and will at least insure proper engagement of the object by the inverting conveyor. To modify the movement of the coated object in another manner, I may employ means, situated between the coating and inverting means, for retarding said object. The retarding force may be exerted by a member extending transversely of the direction of advance of the coated object and with which it contacts. Means is preferably provided for varying the retarding effect, as by mounting the member at different distances from the applying member of the coating machine.

In the advance of the coated pieces, it is desirable to transfer them from a conveyor, as that by which they are inverted, to a receiving surface, which may be furnished by another conveyor. Upon the first conveyor the pieces rest with their coated sides uppermost; but when delivered by it, if they are so flexible that they bend easily, the forward ends may curl under sufficiently to cause the coated sides to come in contact with the receiving surface. To guard against this, an additional feature of the invention resides in means arranged to vary the relation of the delivery-end of the conveyor to the receiving surface. By increasing, for example, the upward angle of the conveyor, as by changing the position of the frame in which it is mounted, the effect of the distortion of the objects may be counteracted, so that they will be deposited accurately with their uncoated sides downward.

A particular embodiment of the invention is illustrated in the accompanying drawing, Figure 1 showing my improved system in side elevation, parts being omitted; and Fig. 2 representing the system in end elevation.

At A appears a coating machine of the kind previously mentioned, this having a cement-tank 10, in which operates an applying roll 12 with its periphery projecting above the top of the tank for contact with the work. The roll is fixed upon a horizontal shaft journaled in the walls of the tank and driven with its co-operating pressure-roll, which appears at 13 in Fig. 2, through gearing 14 and a counter-shaft 16 from a motor 18. All these mechanisms may be mounted upon the top of a suitable frame 20. In using this machine, the shoe-soles S or other work-pieces are advanced by the operator over the applying roll and beneath the pressure-roll, they being coated on their under sides with the cement brought up from the tank by the applying roll. These two rolls, in their rotation, deliver the coated pieces upon a grid 22 consisting of parallel bars having reduced upper edges, which lie in a horizontal plane in substantial alinement with the bite of the rolls. Over the grid the pieces pass and are projected into a space partially enclosed by a guard member 24. This is in the form of a vertically extending conduit, open at its inner side next to the cementing machine and at its lower extremity, and secured at 26 to the frame. The outer wall 28 of the guard member, opposite the path of the soles discharged by the cementing machine over the grid, is inclined outwardly and downwardly, it preferably being curved upon the arc of a circle of considerable radius. For the normal delivery of the work, the wall 28 is far enough removed from the cement-applying roll so that the soles do not contact with it. If, however, they are long or are discharged from the machine at an unusual velocity, the forward ends may strike the curved wall. This not only retains them against being thrown too far to be delivered to the succeeding mechanism, but also tends to deflect the forward extremity of each piece downwardly and rearwardly, so that at least a partial inversion of the piece occurs.

Carried at the lower extremity of the guard are side frames 30, 30, at the opposite ends of which are journaled shafts 32, 32, each of which carries a roll 34. Over these rolls operates a sole-inverting conveyor-belt 36, the upper conveying run of which is approximately horizontal. The lower run travels at opposite sides of guide-rolls 38 and 40, the latter being movable to vary the tension of the belt. This change in position may be effected by mounting the roll 40 upon a yoke 42 pivoted at 44 on the frames 30 and having fixed to its pivot-shaft an arm 46 carrying a weight 48. The weight acts to turn the yoke to the left, as viewed in Fig. 1 of the drawing, forcing the roll 40 yieldably against the outside of the belt 36 and maintaining its upper run taut. The belt 36 is driven as indicated by the arrow (Fig. 1), this being oppositely to the upper applying surface of the roll 12, and consequently to the direction of emergence of the work-pieces from the cementer, and at a considerable rate of speed by a pulley 50 fixed upon the forward shaft 32 and belted to a pulley 52 secured upon the counter-shaft 16. The pulleys 50 and 52 are shown as oppositely stepped, permitting a variation in the speed of the conveyor-belt. The sole-engaging surface of the belt 36 is located at a substantial distance below the line of projection of the soles from the cementing machine, so that in falling they change from the horizontal position in which they issue from said machine to an approximately vertical position, causing the forward extremity only of the sole to strike the rapidly moving surface of the belt. This draws the contacting end of the sole quickly to the right, as viewed in Fig. 1, swinging the uncoated surface, which was uppermost at the cementing machine, downwardly, so that it rests upon the belt, the cemented side now being up.

Sometimes the soles operated upon are flexed upwardly at the toe as they issue from the cementing machine. This may be caused by the practice of operators of bending the soles in the hands before they feed them to the cementer. When soles thus curved are long, or are thrown from the machine at a high velocity, the bent ends may strike the wall 28, and instead of being deflected downwardly will be turned in the opposite direction. This brings what was the rear extremity of the sole to the front in falling through the guard-conduit, with the coated side to the left (Fig. 1), rather than to the right, as is the case in the normal descent of the work. Consequently, the effect of the belt 36 is to throw the coated side down, leading to the result which it is a purpose of this system to prevent. To avoid this, there is arranged between the grid 22 and the wall 28 of the guard member a bar 54, the upper edge of which is located in approximately the same horizontal plane as the grid, and which extends transversely to the direction of movement of the work-pieces from the cementer, substantially parallel to the axis of the applying roll. The bar is shown as carried in alined depressions 56, 56 formed in arms 58, 58 projecting forwardly from the tank 10. This bar 54, contacting with the soles as they travel over it, exerts a retarding effect, so that they will not be projected into contact with the wall 28, and also tends to turn the forward ends down. This brings about such a normal descent of the soles that they will be engaged by the belt 36 when they are in substantially vertical positions, with their cemented surfaces to the right, to be inverted, uncoated side down, upon the belt. As herein illustrated, there are two pairs of bar-supporting depressions 56 provided, enabling said bar to be differently spaced from the bite of the applying and pressure-rolls. By thus altering the position, the best effect may be attained, considering the length of the soles and the operating conditions.

After the successively cemented soles have been deposited end to end upon the belt 36 with their uncoated sides upward, they are delivered to a receiving surface, preferably furnished by a conveyor-belt 60, which is shown extending beneath the forward extremity of the belt 36 and at right angles thereto. This belt 60 is mounted upon opposite rolls 62, 62 carried by shafts 64, 64 rotatable at the opposite extremities of the frame 20. I prefer to mount the shafts 64 upon pairs of arms 66, 66 pivoted for independent movement at 68 and held adjustably in position by pairs of screws 70, 70 threaded through the arms at each side of their pivots and bearing against adjacent surfaces of the frame. By a variation in the angles of these arms, not only may the belt 60 be kept properly tightened, but by differently positioning the arms of either pair, the tension at opposite sides of the belt may be changed to cause it to run to the best advantage upon the rolls. This is of especial utility, since it is sometimes difficult to obtain belts which are of uniform length at the opposite sides. The conveyor-belt 60 is driven to move in the direction of the arrow in Fig. 1, with its upper conveying run traveling from the belt 36, by a pulley 72 secured upon the end of the shaft of the applying roll 12, this being belted to a pulley 74 upon one of the shafts 64. Since the pulleys 72 and 74 are in planes at right angles to each other, the belt connecting them turns through 90 degrees, being guided by three intermediate pulleys 76, 76, 76, which are mounted to rotate upon a bracket 77 rising from the frame 20. The speed at which the belt 60 is driven is preferably less than that of the inverting belt 36, since the former acts purely as a conveyor, and since upon it the soles occupy positions side by side, instead of in longitudinal alinement, so that they may be more closely placed. This conveyor 60 may be that upon which the soles are carried for a considerable distance to permit the cement upon them to set, but preferably is comparatively short, and delivers to a drying conveyor, which is not herein illustrated.

The soles or other work-pieces may be so flexible that when they fall from the belt 36, impelled from it by its considerable speed of travel, their forward extremities will be bent downwardly by gravity and by the resistance of the air, so that instead of the uncoated lower side coming into contact with the belt 60, the curved-over coated forward end will strike said conveyor, causing the piece to be again inverted, now in the wrong direction, with the coated side downward. This bending I overcome by varying the position of the belt 36 with relation to 60. For this purpose, the frame 30 is adjustably supported at convenient points, as upon the lower portion and at opposite sides of the guard member 24, by means here shown as allowing both vertical and horizontal movement and permitting the delivery-end of the belt 36 to be adjusted toward and from the conveyor-belt 60, transversely of its supporting surface and at different angles thereto. This may be attained by passing securing bolts 78 for the frames 30 through horizontal slots 80 in the frames 30 and intersecting vertical slots 82 in the member 24. Obviously, by loosening these bolts, the frames may be shifted horizontally by virtue of the movement of the slots 80 along the bolts, and vertically by the travel of the bolts in the slots 82, while different movements at the opposite ends of the frames change the angular relation. For example, by raising the delivery-end of the belt 36 higher than the opposite end, the soles as delivered will be thrown upwardly, so that the tendency of the forward extremities to turn over into contact with the belt 60 will be counteracted. Moreover, by the horizontal adjustment, the relation of the delivery-end of the belt 36 across the belt 60 may be made such as to dispose the soles on the latter to the best advantage.

To briefly outline the operation of the system, the soles fed by the operator to the cementing machine A are coated by the roll 12 upon their under sides, and by it and the associated pressure-roll are impelled across the grid and the retarding member 54, if the use of this latter is desirable. Entering the space within the guard 24 and deflected downwardly by the wall 28, if their travel is such as to cause contact therewith, they turn from the horizontal to a vertical position, and come in contact with the rapidly moving upper surface of the belt 36. This turns each sole about the point of initial contact at its extremity, bringing the uncoated side down upon the belt, which delivers it from the end beneath the cementer upon the conveyor 60 running at right angles to the inverting conveyor. The latter is so positioned in its angular relation and across the conveyor 60 that the soles fall upon this second conveyor with the coated sides still up and in the desired transverse relation, and are carried out of the system for drying and assembling for future operations.

Having described my invention, what I claim as new and desire to secure by Letters Patent of the United States is:

1. In a coating system, the combination of a coating mechanism and an inverting member separated from the coating mechanism by an open space immediately beneath and beyond said coating mechanism, said mechanism being constructed and arranged to project coated objects into the space, and said inverting member being arranged to contact with the object-edges first emerging from the coating mechanism.

2. In a coating system, the combination of a coating mechanism and an inverting member separated from the coating mechanism by an open space immediately beneath and beyond said coating mechanism, said mechanism being constructed and arranged to project coated objects into the space, said inverting member being inclined forwardly in the direction of projection of the objects and downwardly from the horizontal and arranged to deflect rearwardly the object-edges first emerging from the coating mechanism as the objects travel through the space from the coating mechanism.

3. In a coating system, the combination of coating mechanism having immediately beyond and beneath it an open space, said mechanism being constructed and arranged to project coated objects into the space, an endless traveling inverting member situated at the bottom of the space and into contact with which fall the edges of the objects first emerging from the coating mechanism, and means for moving the surface of the inverting member with which the falling objects contact in the direction opposite to that in which they are projected from the coating mechanism.

4. In a cementing system, rotatable cementing rolls having immediately beyond and beneath them an open space, said rolls being constructed and arranged to project cemented objects into the space, an inverting wall against which the objects are projected by the rolls, said wall being inclined forwardly in the direction of projection of the objects and downwardly from the horizontal and arranged to deflect rearwardly object-edges first emerging from the cementing rolls as said objects travel through the space from said rolls, an inverting conveyor situated at the bottom of the space and into contact with which fall the edges of objects first emerging from the cementing rolls, and means for moving the surface of the inverting conveyor with which the falling objects contact in the direction opposite to that in which they are projected by the cementing rolls.

5. In a coating system, the combination of coating mechanism having immediately beyond and beneath it an open space, said mechanism being constructed and arranged to project coated objects into the space, an endless traveling inverting member situated at the bottom of the space and into contact with which fall the object-edges first emerging from the coating mechanism, means for moving the surface of the inverting member with which the falling objects contact in the direction opposite to that in which they are projected from the coating mechanism, and means arranged to vary the direction in which the endless inverting member travels.

6. In a cementing system, rotatable cementing rolls having immediately beyond and beneath them an open space, said rolls being constructed and arranged to project cemented objects into the space, an inverting wall against which the objects are projected by the rolls, said wall being inclined forwardly in the direction of projection of the objects and downwardly from the horizontal and arranged to deflect rearwardly object-edges first emerging from the cementing rolls as said objects travel through the space from said cementing rolls, an inverting conveyor situated at the bottom of the space and into contact with which fall the edges of objects first emerging from the cementing rolls, a frame upon which the inverting conveyor is mounted, and means arranged to vary the position of the frame both vertically and horizontally.

7. In a coating system, the combination of a coating mechanism and an inverting member separated from the coating mechanism by an open space immediately beneath and beyond said coating mechanism, said mechanism being constructed and arranged to project coated objects into the space, said inverting member being arranged to contact with the object-edges first emerging from the coating mechanism, and a contact member spaced from the coating mechanism and arranged to turn down the forward ends of the objects upon their emergence from said coating mechanism and before they receive the action of the inverting member.

8. In a coating system, the combination of a coating mechanism and an inverting member separated from the coating mechanism by an open space immediately beneath and beyond said coating mechanism, said mechanism being constructed and arranged to project coated objects into the space, said inverting member being arranged to contact with the object-edges first emerging from the coating mechanism, and a retarding member situated between the coating mechanism and the inverting member and arranged to contact with the under sides of the objects as they are projected from the coating mechanism.

9. In a coating system, the combination of a coating mechanism and an inverting member separated from the coating mechanism by an open space immediately beneath and beyond said coating mechanism, said mechanism being constructed and arranged to project coated objects into the space, said inverting member being arranged to contact with the object-edges first emerging from the coating mechanism, a bar with which the under sides of the objects contact upon their emergence from the coating mechanism, and means arranged to permit the distance of the bar from the coating mechanism to be varied.

In testimony whereof I have signed my name to this specification.

JOHN W. COSGROVE.